(12) United States Patent
Horiuchi

(10) Patent No.: US 7,255,363 B2
(45) Date of Patent: Aug. 14, 2007

(54) AIR BAG SUPPORT BELT COVER STRUCTURE

(75) Inventor: Tandanori Horiuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/580,835

(22) Filed: Oct. 16, 2006

(65) Prior Publication Data

US 2007/0085307 A1    Apr. 19, 2007

(30) Foreign Application Priority Data

Oct. 18, 2005    (JP) .............................. 2005-303175

(51) Int. Cl.
*B60R 21/20* (2006.01)

(52) U.S. Cl. .................... 280/728.3; 280/743.2

(58) Field of Classification Search ............. 280/728.1, 280/728.3, 730.1, 731, 732, 739, 743.1, 743.2
See application file for complete search history.

(56) References Cited

U.S. PATENT DOCUMENTS

| 6,007,090 | A | 12/1999 | Hosono et al. | |
|---|---|---|---|---|
| 6,773,028 | B2 * | 8/2004 | Itabashi et al. | 280/730.1 |
| 7,032,923 | B2 * | 4/2006 | Kurata et al. | 280/732 |
| 7,048,299 | B2 * | 5/2006 | Iijima et al. | 280/730.1 |
| 2002/0130496 | A1 * | 9/2002 | Itabashi et al. | 280/730.2 |
| 2004/0150197 | A1 * | 8/2004 | Iijima et al. | 280/730.1 |
| 2004/0207189 | A1 * | 10/2004 | Miyata | 280/743.2 |
| 2004/0256848 | A1 * | 12/2004 | Miyata et al. | 280/743.2 |
| 2005/0040628 | A1 * | 2/2005 | Miyata | 280/730.1 |
| 2005/0127642 | A1 | 6/2005 | Weissert et al. | |
| 2007/0052215 | A1 * | 3/2007 | Miyata | 280/730.1 |
| 2007/0052216 | A1 * | 3/2007 | Miyata | 280/730.1 |

FOREIGN PATENT DOCUMENTS

| DE | 42 01 372 A1 | 7/1992 |
|---|---|---|
| JP | 7-144590 A | 6/1995 |
| JP | 9-132100 A | 5/1997 |
| JP | 2003-327182 A | 11/2003 |

\* cited by examiner

*Primary Examiner*—Paul N. Dickson
*Assistant Examiner*—Toan C. To
(74) *Attorney, Agent, or Firm*—Birch, Stewart, Kolasch & Birch, LLP

(57) ABSTRACT

An air bag support belt cover structure is suitable for an air bag attached to a motorcycle. A right air bag support belt cover covers the top of a storage space for a support belt connected to an air bag. The belt cover is fixed to the support belt by set plates and squeezed portions each formed by squeezing a boss on the rear face of the belt cover. Therefore, the belt cover does not fly off when the support belt deploys along with the expansion and deployment of the air bag. A plurality of engaging hooks provided in the outer edge of the belt cover come off engaging slots located in the vehicle body at the instant when the tension load of the support belt reaches a predetermined value. The support belt can be fixed to the belt cover by a fitting groove formed on the boss and a collar.

20 Claims, 6 Drawing Sheets

AIR BAG SUPPORT BELT COVER STRUCTURE

CROSS-REFERENCE TO RELATED APPLICATIONS

This nonprovisional application claims priority under 35 U.S.C. § 119(a) on patent application Ser. No. 2005-303175, filed in Japan on Oct. 18, 2005, the entirety of which is incorporated herein by reference.

BACKGROUND OF THE INVENTION

1. Field of the Invention

The present invention relates to an air bag support belt cover structure. More particularly, the present invention relates to an air bag support belt cover structure that is suitable for an air bag attached to a motorcycle.

2. Description of Background Art

Various methods have been considered in the background art to apply an air bag for effectively restraining an occupant to a motorcycle when a predetermined or greater impact is applied to a vehicle body. One large difference between a motorcycle and a four-wheeled vehicle is that the occupant is not restrained in the vehicle body by a seat belt or the like. Therefore, a method according to the background art includes supporting an air bag by a case in which the air bag has been stored and by a support belt. One end of the support bag is fixed to a vehicle body and the other end is connected to the air bag. Therefore, the air bag is pulled backward from the vehicle body by the support belt when the air bag expands and deploys in order to effectively restrain an occupant.

Japanese Patent Laid-Open No. 2003-327182 discloses an air bag apparatus for a scooter type motorcycle, wherein air bag support belts as described above are stored in a pair of right and left storage grooves, which are provided along a front cover, leg shields, footrests, and a rear cover.

When using the air bag support belts as described above, preferably storage sections therefor are provided with cover members for protection from influences caused by an external factor such as the weather. In the background art, there has been a system similar to this kind of cover member structure, in which hook protrusions are provided at several places on the rear face of each cover member and the cover member is connected to the storage section in such a way that the protrusions are fitted into fitting grooves provided on the storage section. In the fitting structure only with the hook protrusions or the structure disclosed in the Japanese Patent Laid-Open No. 2003-327182; however, consideration need be given to an arrangement for preventing the cover member from coming off due to some impact or for preventing the cover member from flying off in an unpredictable direction when the support belt is pulled out along with expansion and deployment of the air bag.

SUMMARY OF THE INVENTION

An object of the present invention is to resolve the above-mentioned problem of the technology according to the background art and to provide an air bag support belt cover structure suitable for an air bag attached to a motorcycle.

In order to achieve the above object, according to a first feature of the present invention, there is provided an air bag support belt cover structure with support belts for connecting a motorcycle to an air bag, the air bag support belt cover structure comprising: an air bag module located in the center or substantially center of a vehicle body in a vehicle width direction; a fuel filler lid located to the rear of the air bag module in the vehicle body; storage spaces for storing the support belts, with being located on both sides of the fuel filler lid and extending in an anteroposterior direction of the vehicle body; top shelters located on both sides of the storage spaces outwardly in the vehicle width direction; air bag support belt covers forming a generally flat and smooth exterior surface along the fuel filler lid and the top shelters by covering the storage spaces from above to close them; a plurality of bosses provided on the rear face of the air bag support belt cover, being arranged in parallel at substantially the same distance as the width of the support belt; and a plate for fixing the support belt to the air bag support belt cover by using the bosses.

A second feature lies in that the plate is fixed to the cover by deforming and squeezing the distal ends of the bosses.

A third feature lies in that the plate is fixed to the air bag support belt cover by fitting a collar in a fitting groove provided on each of the bosses.

Furthermore, a fourth feature lies in that the air bag support belt cover is fixed between the fuel filler lid and the top shelter by a plurality of engaging hooks provided in the outer edge of the air bag support belt cover.

According to the present invention having the first feature, the air bag support belt cover is hard to come off due to disturbance and the air bag support belt cover and the support belt come off integrally when the air bag expands and deploys. Therefore, the air bag support belt cover is improved in flying off. Furthermore, the stored position of the support belt is inevitably determined during the assembly work of the motorcycle. Therefore, errors in assembling components decrease and the number of working processes can be reduced.

According to the present invention having the second feature, the support belt can be fixed to the air bag support belt cover by deforming the distal ends of the bosses using a heat squeezing tool or the like. Therefore, other parts for fixing them are unnecessary and thus the number of production processes can be reduced.

According to the present invention having the third feature, the support belt can be connected to the air bag support belt cover only by the collar fitting work. Therefore, the number of working processes of assembling components can be reduced.

According to the present invention having the fourth feature, a tension load necessary to release the air bag support belt cover can be easily adjusted by changing the number or shape of the engaging hooks.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
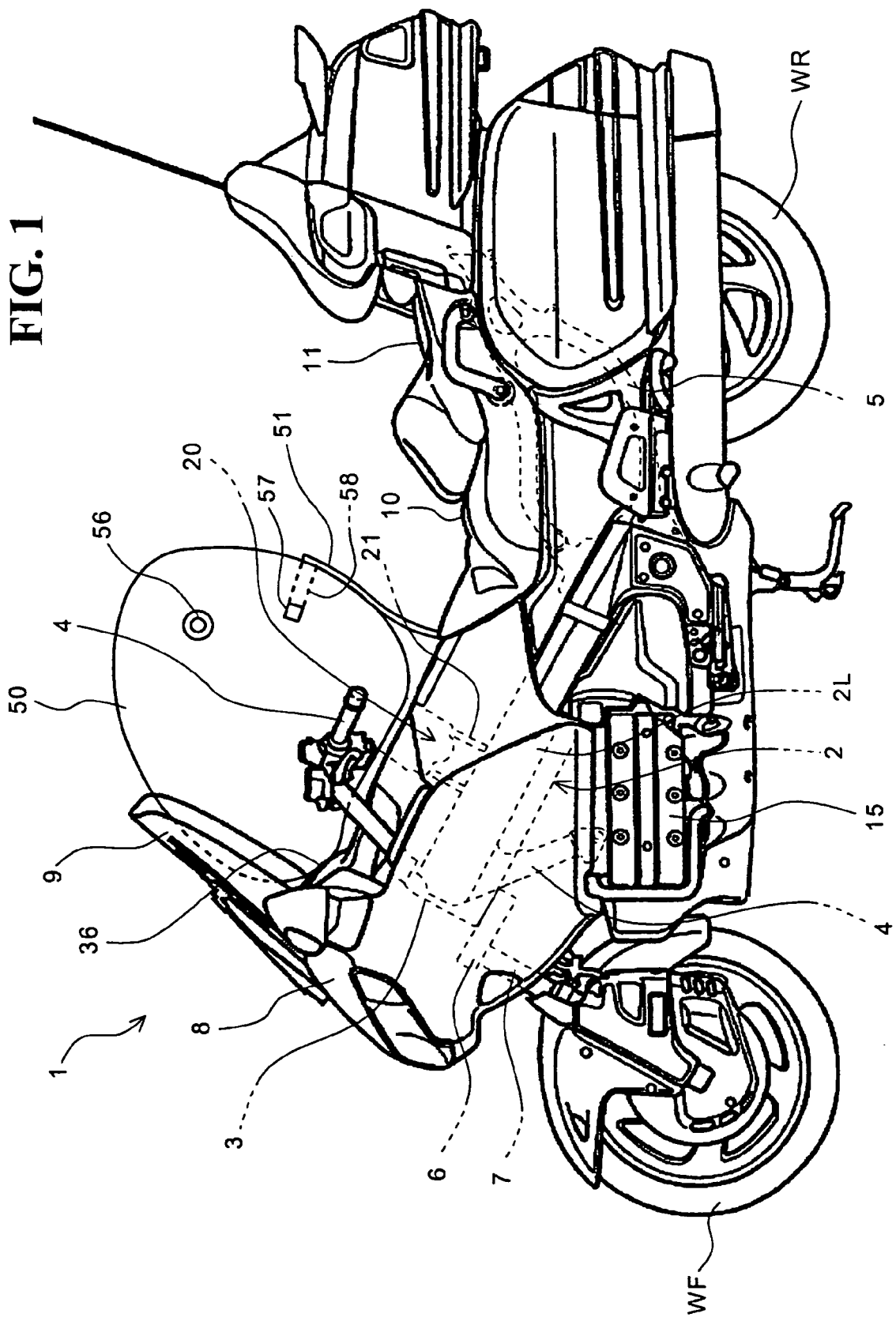
FIG. 1 is a general schematic diagram of a motorcycle according to one embodiment of the present invention.

An embodiment of the present invention will now be described with reference to the accompanying drawings. The same reference numerals will be used to identify the same or similar elements throughout the several views. It should be noted that each of the drawings should be viewed in the direction of orientation of the reference numerals.

Referring to FIG. 1, there is shown a general schematic diagram of a motorcycle 1 to which an air bag support belt cover structure according to one embodiment of the present invention is applied. A frame 2 of the motorcycle 1 is mainly composed of a pair of left and right upper tubes 2L and 2R (see FIG. 2) extending from a head pipe 3 obliquely downward toward the rear of the vehicle body. A lower tube 4 extends downward from the vicinity of the head pipe 3 of the upper tubes 2L and 2R, with an engine 15 as a driving source fixedly suspended at the distal end of the lower tube 4. The head pipe 3 rotatably supports a pair of right and left front forks 7, which can be steered by handles 4, by means of a shaft via a lower bracket 6, and the front forks 7 rotatably and pivotally support a front wheel WF at their lower ends. Furthermore, the frame 2 is connected to a seat frame 5 for supporting a main seat 10, a rear seat 11, and the like in the rear of the vehicle body. A rear wheel WR as a drive wheel is rotatably and pivotally supported by a swing arm (not shown) swingably connected to the frame 2 at the rear end of the swing arm.

The motorcycle 1 according to this embodiment is provided with an air bag 50 that expands and deploys into a generally spherical form of a size that reaches the vicinity of a window screen 9 located at the upper end of an upper cowl 8, coming into contact with a meter case 36 from above the main seat 10, when a predetermined or greater impact is applied to the vehicle body. An air bag module 20 for integrally housing the air bag 50 and an inflator (not shown) that generates a gas for expanding and deploying the air bag 50 is fixed to the upper tubes 2L and 2R by means of a support stay 21, in a position forward of the occupant's sitting position in the vehicle body. In addition, support belts 51, which keep the air bag 50 in a proper position in order to effectively restrain the occupant, are connected to the rear sides of the air bag 50 in the vehicle body. The upper ends of the support belts 51 are built in the air bag 50 and connected to a second support belt 58 for connecting the right and left joints 57 in an arch so as to prevent the air bag 50 from largely moving in a horizontal direction while restraining the occupant. Moreover, vent holes 56 are provided for discharging the gas at an appropriate speed while restraining the occupant on the right and left side surfaces above the second support belt 58.

Figure 2:
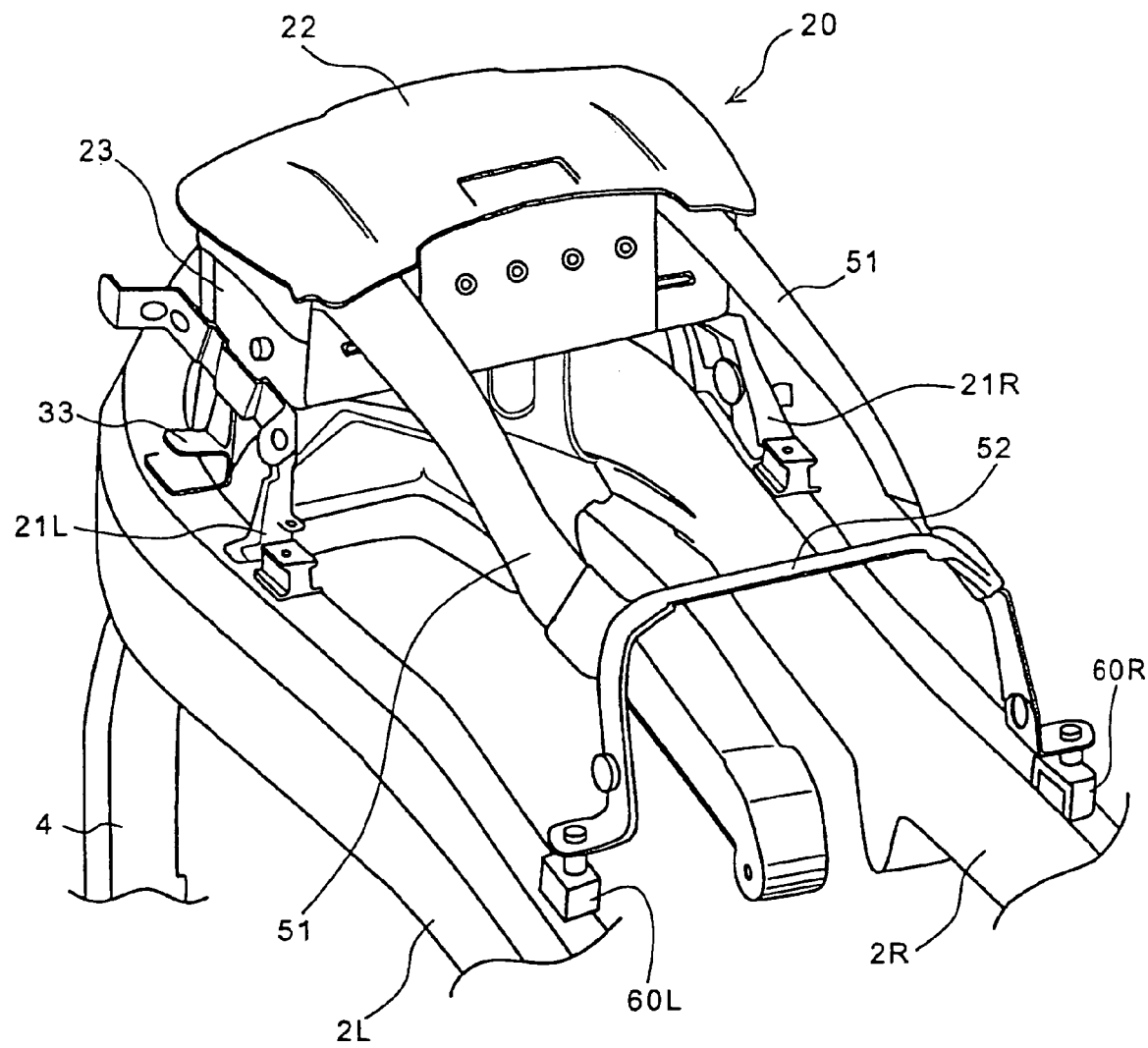
FIG. 2 is an arrangement illustration of the air bag support belt cover structure according to the embodiment of the present invention.

Referring to FIG. 2, there is shown a general schematic diagram illustrating a mounting structure of the air bag module 20. The same reference numerals as in the above denote the parts, which are the same as or equivalent to those in the above. The air bag module 20, having a structure in which the inflator and the folded air bag 50 are housed in a casing 23 formed in a generally rectangular parallelepiped box with the top of the casing 23 covered with a module cover 22, is placed straddling the space between the upper tubes 2L and 2R by means of a left support stay 21L and a right support stay 21R welded at the bottom of the casing 23 and a third support stay 33 fastened to the casing 23 by bolts. Moreover, the other end of the support belt 51 whose one end is connected to the air bag 50 is firmly fastened to an arch-shaped belt fixing stay 52 and the belt fixing stay 52 is fixed to attachment parts 60L and 60R welded on the top face in the rear of the upper tubes 2L and 2R in the vehicle body. According to the mounting structure of the air bag module 20, the air bag module 20 is located in a relatively high position to the upper tubes 2L and 2R. Therefore, it becomes possible to effectively use the space under the air bag module 20 by disposing an audio unit, an air cleaner box, or the like in that space and to do maintenance of various components as described above without removing or detaching the air bag module 20, only by unfastening the third support stay 33.

Figure 3:
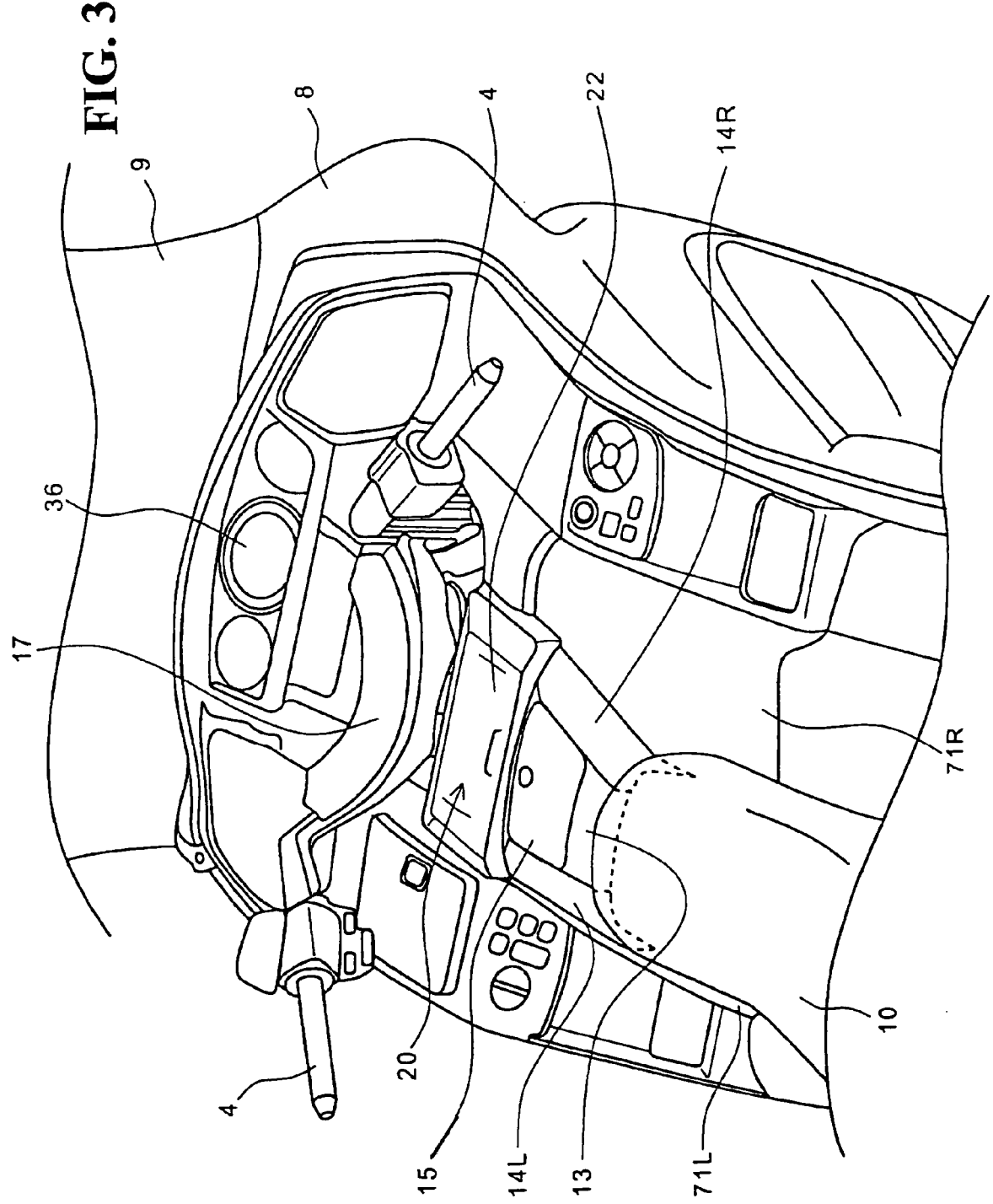
FIG. 3 is a partially enlarged view of the motorcycle according to the embodiment of the present invention.

Referring to FIG. 3, there is shown a partially enlarged view of the motorcycle 1 to which the air bag support belt cover structure according to the embodiment of the present invention is applied. The same reference numerals as in the above denote the parts, which are the same as or equivalent to those in the above. The air bag module 20 is located between an audio panel 17 provided between the right and left handles 4 and a fuel filler lid 15 of an open/close type provided above an oil filler port (not shown) of a fuel tank. The support belts 51 (See FIG. 2) are placed under a left air bag support belt cover 14L and a right air bag support belt cover 14R, which are arranged on both sides of the fuel filler lid 15 in the vehicle width direction. The air bag support belt cover structure according to the present invention is applied to the left air bag support belt cover 14L and the right airbag support belt cover 14R. Furthermore, a left top shelter 71L and a right top shelter 71R are located in the exterior sides of the left air bag support belt cover 14L and the right air bag support belt cover 14R in the vehicle width direction, and a central shelter 13 is provided between the fuel filler lid 15 and the main seat 10.

Figure 4:
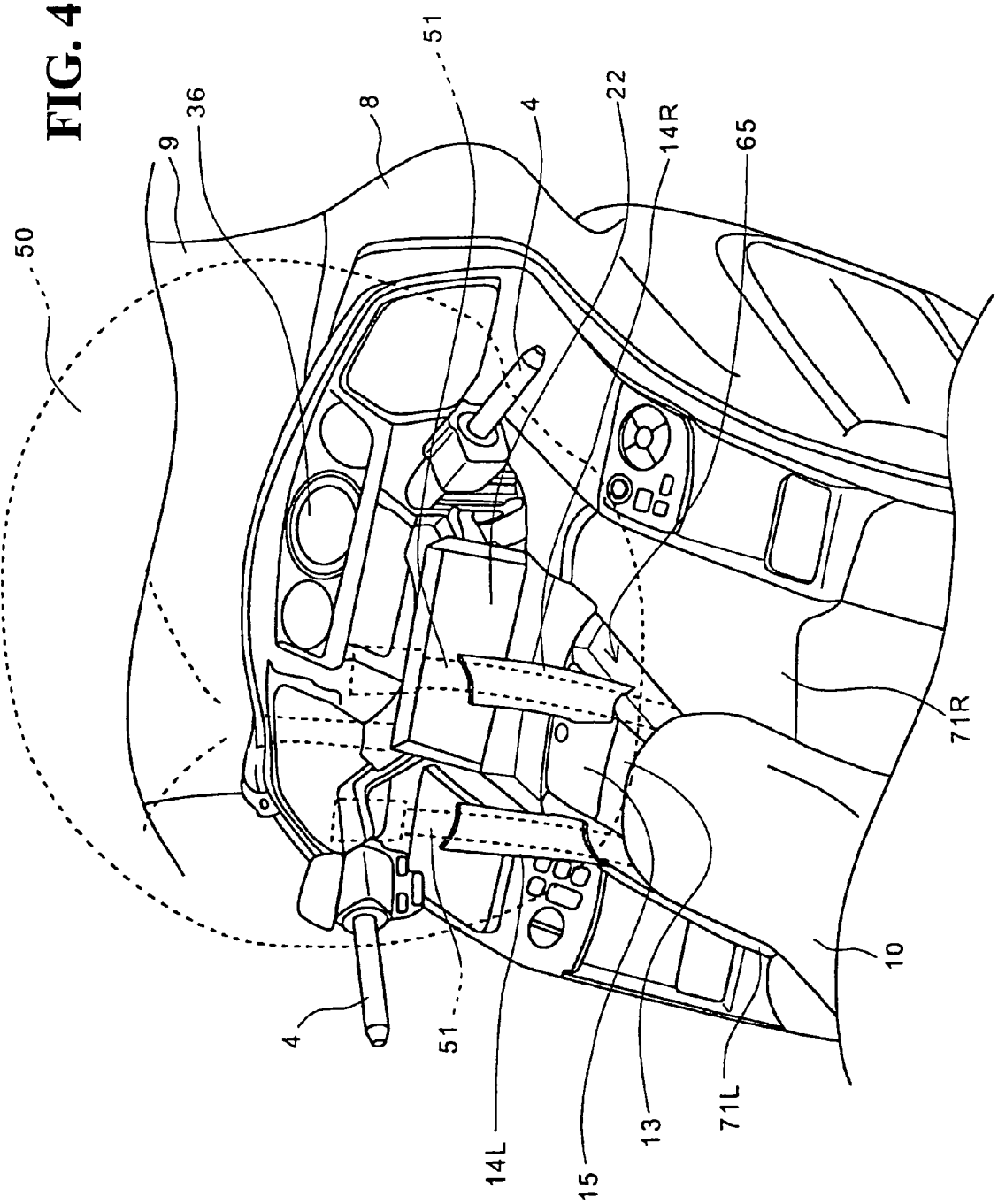
FIG. 4 is a partially enlarged view of the motorcycle according to the embodiment of the present invention.

Referring to FIG. 4, there is shown a partially enlarged view of the motorcycle 1 in a state where the air bag 50 expands and deploys. The same reference numerals as in the above denote the parts, which are the same as or equivalent to those in the above. The air bag module 20 is configured in such a way that a gas generated by the inflator is instantly supplied to the air bag 50 in the casing 23 upon a predetermined or greater impact to the vehicle body and the gas pressure causes the module cover 22 to open around one side located forward of the vehicle body, by which the air bag 50 smoothly expands and deploys. The support belts 51 housed in storage spaces 65 under the left air bag support belt cover 14L and the right air bag support belt cover 14R are adapted to deploy up to the positions indicated by the dashed lines shown here together with the left air bag support belt cover 14L and the right air bag support belt cover 14R as the air bag 50 expands and deploys. When the air bag 50 restrains the occupant, the air bag 50 is not only pulled by the support belts 51 from the back side by means of the support belts 51, but also stably supported on the forward and lower side of the air bag 50 by means of the handles 4, the meter case 36, and the module cover 22.

Figure 5:
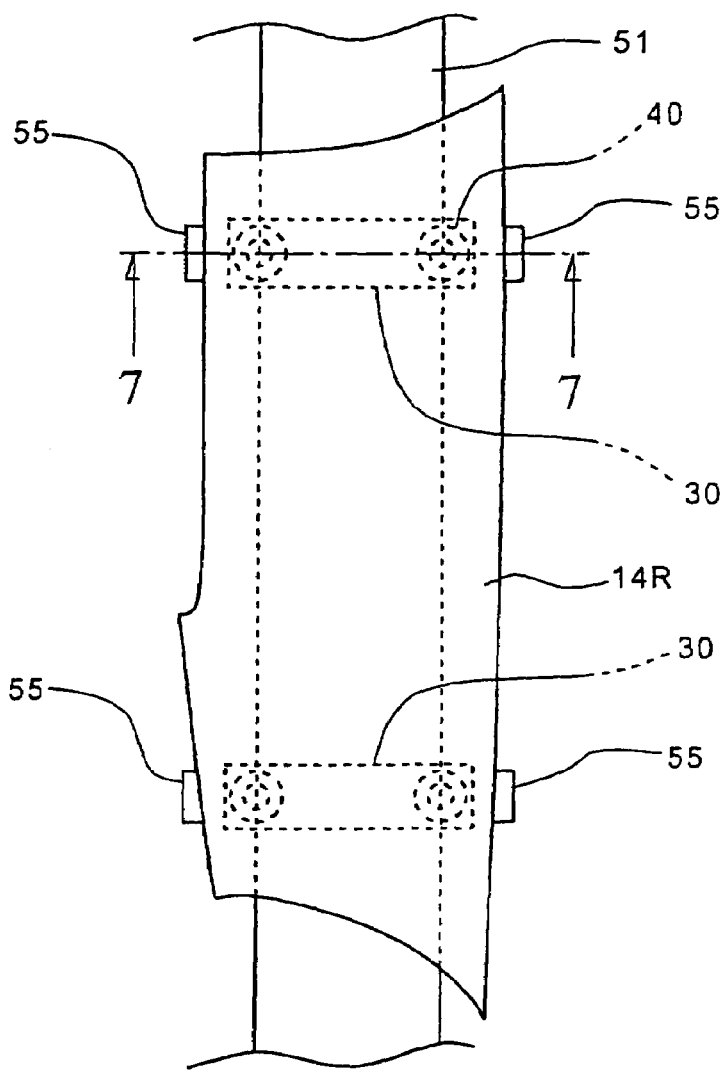
FIG. 5 is a general schematic diagram of the air bag support belt cover structure according to the embodiment of the present invention.

Referring to FIG. 5, there is shown a general schematic diagram of the air bag support belt cover structure according to the embodiment of the present invention. Since the left air bag support belt cover 14L has symmetrically the same structure as the right air bag support belt cover 14R, only the right air bag support belt cover 14R will be described in the following description. The right air bag support belt cover 14R is not separated from the support belt 51 when the air bag 50 expands and deploys as shown in FIG. 4, because the right air bag support belt cover 14R is connected to the support belt 51 by means of set plates 30 and squeezed portions 40. If the support belt 51 is pulled upward when the air bag 50 expands and deploys, along with this the right air bag support belt cover 14R placed on the support belt 51 is also forcibly pulled upward. Thereafter, when a predetermined tension load is exceeded, engaging hooks 55 come off engaging slots (not shown) located on the vehicle body and thereby the right air bag support belt cover 14R connected to the support belt 51 is caused to deploy upward together with the support belt 51. If the squeezed portions 40 are arranged, as shown, in parallel at substantially the same distance as the width of the support belt 51 on a straight line, which is almost perpendicular to the longer direction of the support belt 51, it is possible to effectively prevent wobbling or the like between the right air bag support belt cover 14R and the support belt 51. The arrangement of the squeezed portions 40 and the engaging hooks 55, however, can be altered in various ways in accordance with peripheral components in contact with the right air bag support belt cover 14R.

According to the above configuration, the air bag support belt cover and the support belt are integrally detached when the air bag expands and deploys. This eliminates the possibility that the air bag support belt cover flies off in an unpredictable direction. Moreover, the stored position of the support belt is uniquely determined during assembly of the motorcycle. Therefore, errors in assembling components decrease and the number of working processes can be reduced. Moreover, the tension load necessary to release the air bag support belt cover can be easily adjusted by changing the number or shape of the engaging hooks provided in the outer edge of the air bag support belt cover.

Figure 6:
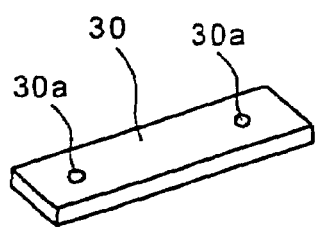
FIG. 6 is a perspective diagram of a set plate for fixing a support belt.

Referring to FIG. 6, there is shown a perspective diagram of the set plate 30. The set plate 30, which is a generally rectangular thin plate, is provided with through-holes 30a through which bosses (see FIG. 7) provided on the backside of the right air bag support belt cover 14R passes. The set plate 30 can be formed of any metal, resin, or the like having such a strength that no deformation or the like is caused by an impact accompanied by the expansion and deployment of the air bag 50.

Figure 7:
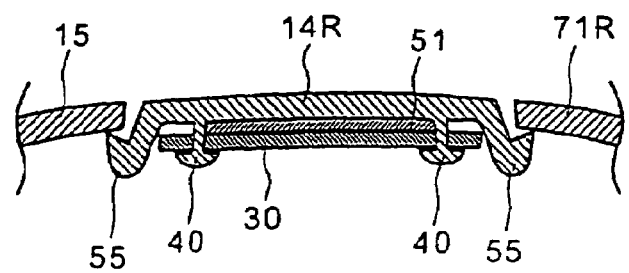
FIG. 7 is a cross section along the line 7-7 in FIG. 5.

Referring to FIG. 7, there is shown a cross section along the line 7-7 in FIG. 5. The same reference numerals as in the above denote the parts, which are the same as or equivalent to those in the above. FIG. 7 also shows the cross section of the fuel filler lid 15 and the right top shelter 71R engaged to the engaging hooks 55 of the right air bag support belt cover 14R. The support belt 51 abutting against the rear face of the right air bag support belt cover 14R is fixed to the right air bag support belt cover 14R by means of the set plate 30 and the squeezed portions 40 located in the lower part of the illustration.

Figure 8:
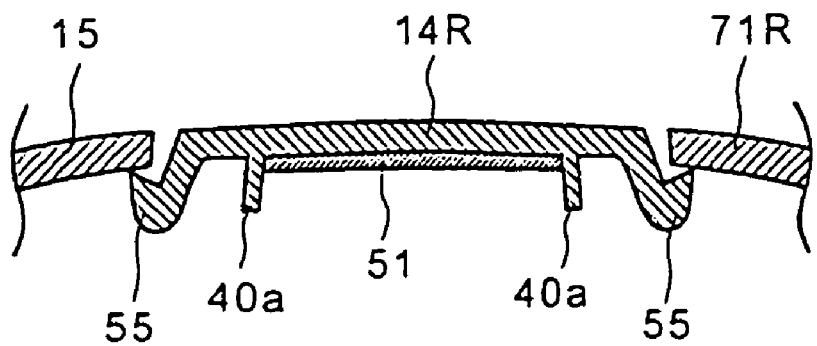
FIG. 8 is a cross section of the air bag support belt cover before the set plate is attached.

Referring to FIG. 8, there is shown a state of the right air bag support belt cover 14R before the set plate 30 is placed. The same reference numerals as in the above denote the parts, which are the same as or equivalent to those in the above. Bosses 40a as generally cylindrical protrusions are integrally formed on the rear face of the right air bag support belt cover 14R made of thermoplastic resin or the like. The squeezed portion 40 (see FIG. 7) is formed by passing the boss 40a through the through-hole 30a of the set plate 30 in the state shown in the above diagram and then heating the distal end of the boss 40a using a heat squeezing tool or the like to induce plastic deformation. According to the air bag support belt cover structure of this embodiment, the support belt and the air bag support belt cover can be fixed to each other by low parts count as described above.

Figure 9:
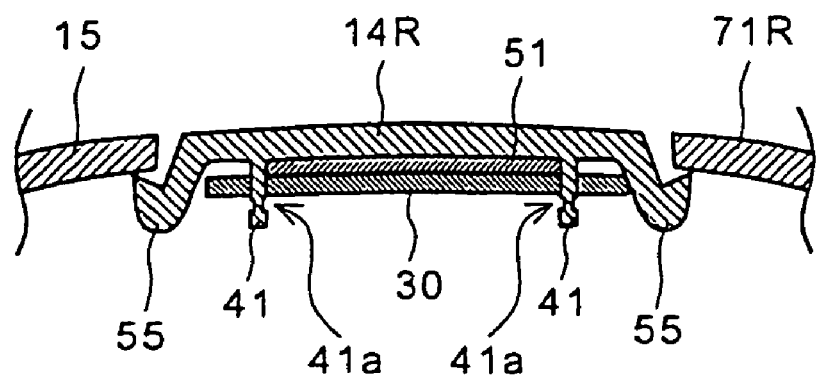
FIG. 9 is a cross section before collars are attached in the air bag support belt cover structure according to a second embodiment of the present invention.
Figure 10:
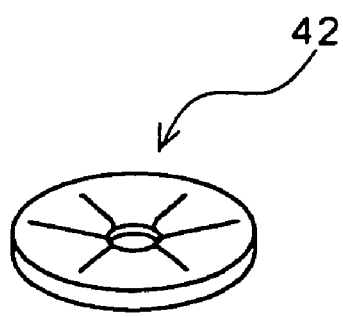
FIG. 10 is a perspective diagram of the collar for fixing a set plate.
Figure 11:
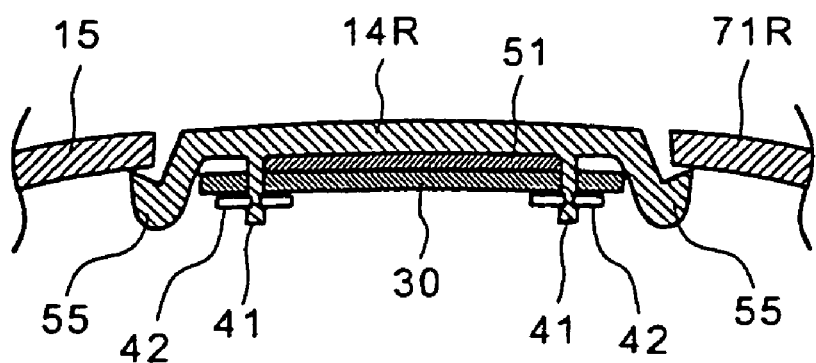
FIG. 11 is a cross section of the air bag support belt cover structure according to the second embodiment of the present invention.

FIGS. 9 to 11 show the air bag support belt cover structure according to a second embodiment of the present invention. Regarding the right air bag support belt cover 14R shown in FIG. 9, the support belt 51 is connected to the right air bag support belt cover 14R by providing a fitting groove 41a in the periphery of each cylindrical boss 40 and fitting a collar 42 shown in FIG. 10 into the fitting groove 41a. According to the air bag support belt cover structure of this embodiment, the support belt can be connected to the air bag support belt cover only by fitting the collars 42. Therefore, it is possible to reduce the number of working processes of assembling the components. Moreover, a ring speed washer, a C-shaped snap ring, or the like can be used for the collar 42 and the shape of the fitting groove 41a can be altered in various ways according to the collar employed.

Naturally, the shape or material of the air bag support belt cover or set plate, the shape or number of the engaging hooks or bosses for the air bag support belt cover, the method of fixing the set plate, and the like are not limited to the above embodiments, but can be altered in various ways.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air bag support belt cover structure, comprising:
    support belts for connecting a vehicle body to an air bag;
    an air bag module located at substantially a center of a vehicle body in a vehicle width direction;
    a fuel filler lid located to the rear of the air bag module in the vehicle body;
    storage spaces for storing the support belts, the storage spaces being located on both sides of the fuel filler lid and extending in an anteroposterior direction of the vehicle body;
    top shelters located on both sides of the storage spaces outwardly in the vehicle width direction;
    air bag support belt covers forming a generally flat and smooth exterior surface along the fuel filler lid and the top shelters by covering and closing the storage spaces from above;

a plurality of bosses provided on a rear face of each of the air bag support belt covers, the plurality of bosses being arranged in parallel at substantially the same distance as the width of the support belt; and a plate for fixing each of the support belts to the air bag support belt covers using the bosses.

2. The air bag support belt cover structure according to claim 1, wherein each plate is fixed to the cover by deforming and squeezing the distal ends of the bosses.

3. The air bag support belt cover structure according to claim 1, wherein each plate is fixed to the air bag support belt cover by fitting a collar in a fitting groove provided on each of the bosses.

4. The air bag support belt cover structure according to claim 1, wherein the air bag support belt cover is fixed between the fuel filler lid and the top shelter by a plurality of engaging hooks provided in the outer edge of the air bag support belt cover.

5. The air bag support belt cover structure according to claim 2, wherein the air bag support belt cover is fixed between the fuel filler lid and the top shelter by a plurality of engaging hooks provided in the outer edge of the air bag support belt cover.

6. The air bag support belt cover structure according to claim 3, wherein the air bag support belt cover is fixed between the fuel filler lid and the top shelter by a plurality of engaging hooks provided in the outer edge of the air bag support belt cover.

7. The air bag support belt cover structure according to claim 1, wherein the support belt is located between the plate and the air bag support belt cover.

8. The air bag support belt cover structure according to claim 2, wherein the support belt is located between the plate and the air bag support belt cover.

9. The air bag support belt cover structure according to claim 3, wherein the support belt is located between the plate and the air bag support belt cover.

10. The air bag support belt cover structure according to claim 4, wherein the support belt is located between the plate and the air bag support belt cover.

11. An air bag support belt cover structure for a vehicle, the vehicle including support belts for connecting a vehicle body to an air bag, the air bag support belt cover structure comprising:

a pair of air bag support belt covers, each belt cover forming a generally flat and smooth exterior surface along a fuel filler lid and top shelters of the vehicle;

a plurality of bosses provided on a rear face of each of the air bag support belt covers, the plurality of bosses being arranged in parallel at substantially the same distance as the width of the support belt; and a plate for fixing each of the support belts to the air bag support belt covers using the bosses.

12. The air bag support belt cover structure according to claim 11, wherein each plate is fixed to the cover by deforming and squeezing the distal ends of the bosses.

13. The air bag support belt cover structure according to claim 11, wherein each plate is fixed to the air bag support belt cover by fitting a collar in a fitting groove provided on each of the bosses.

14. The air bag support belt cover structure according to claim 11, wherein the air bag support belt cover is fixed between the fuel filler lid and the top shelter by a plurality of engaging hooks provided in the outer edge of the air bag support belt cover.

15. The air bag support belt cover structure according to claim 12, wherein the air bag support belt cover is fixed between the fuel filler lid and the top shelter by a plurality of engaging hooks provided in the outer edge of the air bag support belt cover.

16. The air bag support belt cover structure according to claim 13, wherein the air bag support belt cover is fixed between the fuel filler lid and the top shelter by a plurality of engaging hooks provided in the outer edge of the air bag support belt cover.

17. The air bag support belt cover structure according to claim 11, wherein the support belt is located between the plate and the air bag support belt cover.

18. The air bag support belt cover structure according to claim 12, wherein the support belt is located between the plate and the air bag support belt cover.

19. The air bag support belt cover structure according to claim 13, wherein the support belt is located between the plate and the air bag support belt cover.

20. The air bag support belt cover structure according to claim 14, wherein the support belt is located between the plate and the air bag support belt cover.

* * * * *